D. J. NEVILL.
ORE CLASSIFIER.
APPLICATION FILED JUNE 17, 1914.
1,156,544.
Patented Oct. 12, 1915.
3 SHEETS—SHEET 3.
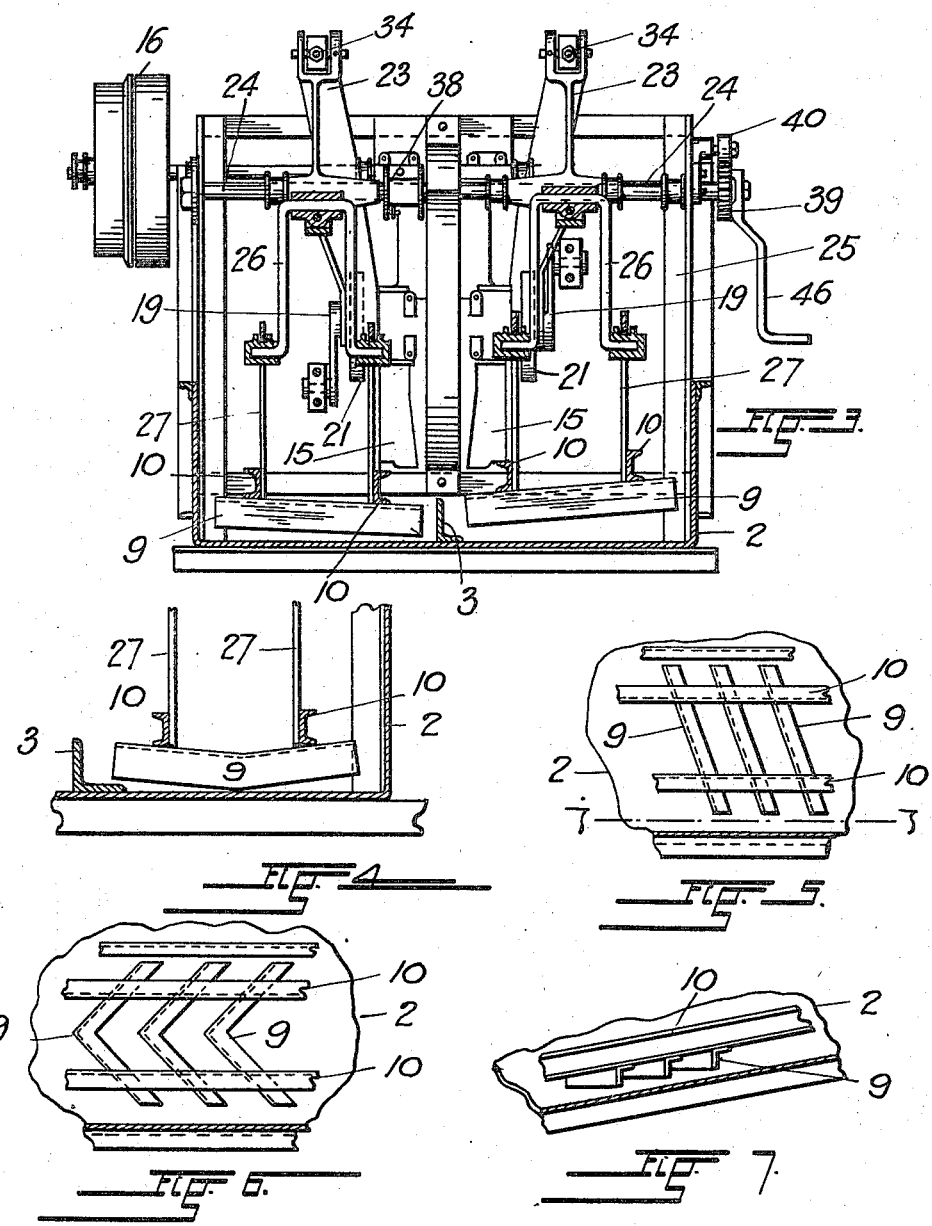
WITNESSES:
INVENTOR.
D. J. NEVILL.
BY
ATTORNEY.

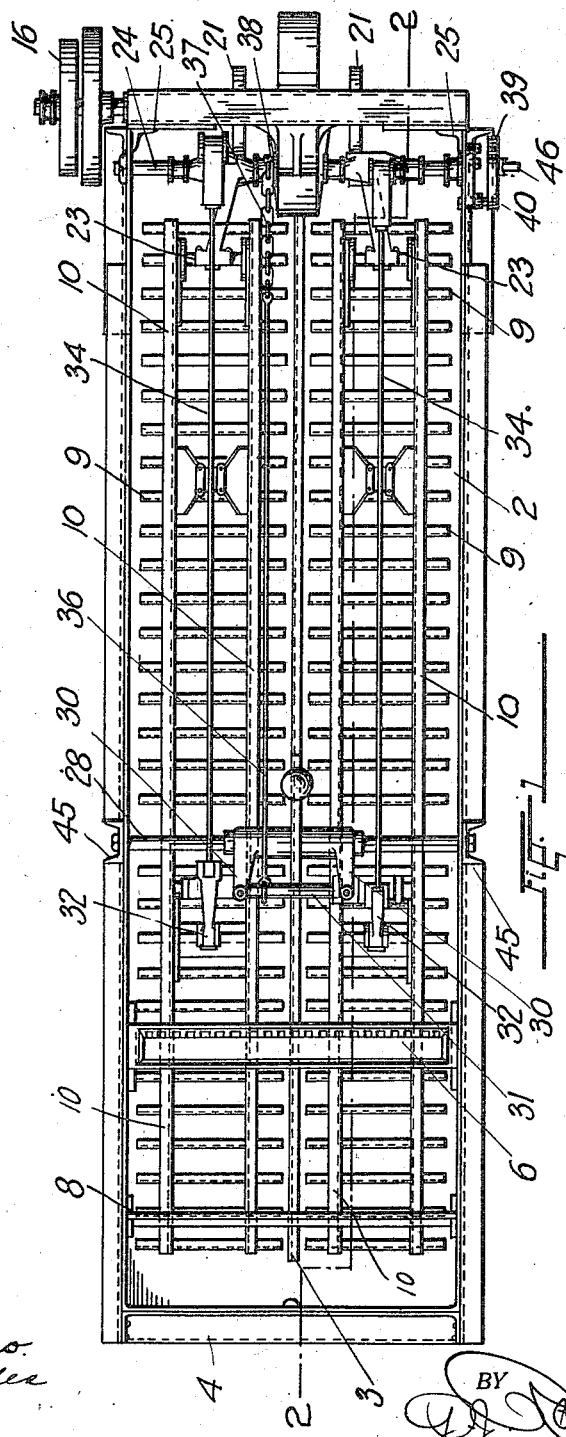

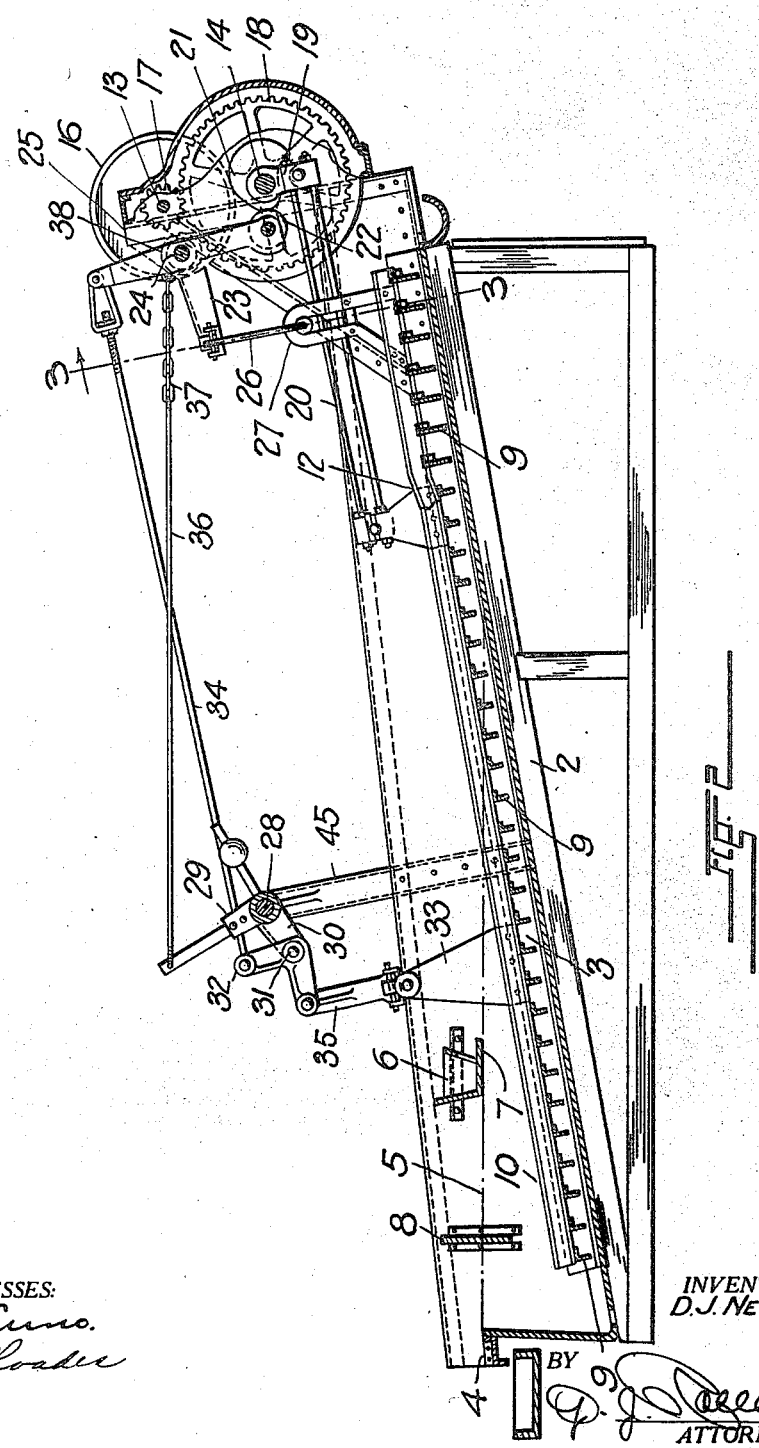

UNITED STATES PATENT OFFICE.

DAVID J. NEVILL, OF DENVER, COLORADO, ASSIGNOR TO THE DORR CYANIDE MACHINERY COMPANY, A CORPORATION OF COLORADO.

ORE-CLASSIFIER.

1,156,544.              Specification of Letters Patent.        Patented Oct. 12, 1915.

Original application filed January 28, 1913, Serial No. 744,644. Divided and this application filed June 17, 1914. Serial No. 845,576.

*To all whom it may concern:*

Be it known that I, DAVID J. NEVILL, a citizen of the United States, residing at Denver, in the county of Denver and State of Colorado, have invented certain new and useful Improvements in Ore-Classifiers, of which the following is a specification.

This invention relates to improvements in classifiers or dewaters of the type shown and described in Letters-Patent No. 849,379, John V. N. Dorr, April 9, 1907; No. 996,624, John V. N. Dorr, July 4, 1911; and No. 1,024,647, David J. Nevill, April 30, 1912, and it is divisional of my application for patent Serial No. 744,644, filed January 28, 1913.

One of the objects of the present invention resides in an improved construction of the rake element by which the transversely extending gullies produced by its reciprocating movement in the sands at the bottom of the inclined settling trough, are at the upper end thereof, formed to slope toward a side of the trough for the purpose of draining water carried upwardly with the sand.

Another object of my invention resides in the provision of mechanism by which the reciprocating rake element which is suspended in the trough to normally move in a plane substantially parallel to the bottom thereof, may be readily raised to a plane at an angle to the first-mentioned plane and above the level of material contained in the trough, for purposes hereinafter to be explained.

The means by which I attain the above-mentioned objects are in their preferred form, shown in the accompanying drawings in the various views of which like parts are similarly designated, and in which, Figure 1 is a plan view of the improved classifier, Fig. 2, a longitudinal, vertical section taken through the settling trough, along the line 2—2, Fig. 1, Fig. 3, a transverse section along the line 3—3, Fig. 2, Fig. 4, a transverse section through the trough showing a modification of the construction of the rake blades at the upper end of the machine, Figs. 5 and 6 fragmentary plan views of the upper portion of the rake illustrating still other modifications in the construction of the same, and Fig. 7, a section taken along the line 7—7, Fig. 5.

Referring to the drawings, the reference numeral 2 designates a settling trough which is divided into two adjoining compartments, by a longitudinally extending partition 3.

The trough which is supported upon a structure of suitable construction, is at its lower end, provided with an overflow 4 which determines the level 5 of material contained therein, and through which the slimes contained in the pulp are discharged while the sands are removed through the upper, open end of the trough by the action of the rakes hereinafter to be described.

The wet pulp is fed into the trough through a hopper 6 which at its lower end has a plurality of slots through which the material flows onto a distributing plate 7.

A baffle 8 which regulates the velocity with which the fluid matter is discharged through the overflow, also determines the carrying power of the fluid for the fine material of which the slimes are composed.

The sands contained in the pulp, settle on the inclined bottom of the trough and are moved to the upper end of the same by the action of reciprocating rakes which in the duplex construction shown in the drawings, include two coöperative elements which are separately disposed in the two compartments of the trough.

Each rake element is composed of a series of substantially equidistant blades 9 which at their upper edges are secured in transverse relation to two parallel bars 10, the outer one of which is off-set in an upward direction as at 12 in Fig. 2, for the purpose of inclining the blades at the upper end of the trough, from their outer ends inwardly as is best shown in Fig. 3 of the drawings.

When in the operation of the machine the rake element reciprocates, the blades moving longitudinally through the sand at the bottom of the trough, form transversely extending ridges, and by inclining the upper blades as described, the gullies between said ridges are at the upper end of the trough, formed to slope toward a side thereof, thereby permitting fluid carried upwardly with the sand by the action of the rakes to readily drain toward the lower end of the machine. The same result may be obtained by inclining the lower edges of the blades in opposite directions from a central point, as is illustrated in Fig. 4 of the drawings, or the same effect may be produced by placing the blades obliquely with relation to the direction of their reciprocating motion as shown in Figs. 5 and 7, or by using angular blades the sides of which diverge from a central longitudinal line in the rake element as shown in Fig. 6, or by any other method capable of forming gullies through which the water will flow toward the slimes-discharge end of the trough.

In a double trough of the character shown in the drawings, the two rake elements are connected with one and the same adjusting and operating mechanism to reciprocate simultaneously in opposite directions.

The mechanism above referred to consists of a pair of parallel shafts 13 and 14 which are mounted in boxes on a pair of connected standards 15 at the upper end of the trough. The upper one of the two shafts carries a pulley 16 for its operative connection with a motor, and its rotary movement is transmitted to the lower shaft by means of a pair of gear wheels 17 and 18. The shaft 14 has at its ends, oppositely extending cranks 19 which by means of pitmen 20 are connected with the rake elements in the trough compartments to impart a reciprocating movement to the same, and the said shaft is furthermore provided with cams 21 the circumferential faces of which are engaged by anti-friction wheels 22 at the lower ends of levers 23 which are fulcrumed upon a shaft 24 which is rotatably supported in bearing on a frame 25 at the upper end of the trough.

The levers 23 have laterally extending arms which by means of pivoted yokes 26 are connected for universal movement, with link-shaped hangers 27 at the upper ends of the rake elements.

Rotatably mounted upon a shaft 28 which is supported in bearings on uprights 45 secured to the sides of the trough, is a bell-crank including a single upwardly extending arm 29 and two laterally projecting arms 30. The last-mentioned arms carry at their extremities, a shaft 31 upon which are fulcrumed two bell cranks 32 the arms of which are connected respectively, by means of rods 34 with the upper ends of the levers 23, and by means of links 35, with hangers 33 adjacent the lower ends of the rake elements.

The links 35 are connected with the hangers by universal joints which serve to permit of a limited independent movement of the rakes to prevent their breakage by engagement with obstructions encountered during their reciprocating movement.

The arm 29 of the bell crank on the shaft 28 is by means of a rod 36 connected with a chain 37 whose opposite end is attached to a winding drum 38 mounted upon the before-mentioned shaft 24 which at one of its ends is provided with a crank handle 46 by means of which it can be rotated for the purpose of winding the chain upon the drum. The shaft furthermore carries a ratchet wheel 39 which in conjunction with a pawl 40 on an adjacent part of the frame 25, prevents its retrograde movement.

In the operation of my improved classifier the reciprocating rakes impel during their upward effective strokes in which the lower edges of their blades move in a plane substantially parallel to the bottom surface of the trough, the sands settled out of the pulp, upwardly along the said surface toward the upper open end of the trough through which they are removed. The slimes contained in the pulp are at the same time maintained in suspension and are discharged through the overflow at the lower end of the trough. The rakes are at the termination of their effective stroke, lifted above the surface of the sand in the trough by the action of the cams on the levers 23 so that during their return strokes they may move downwardly without disturbing the sand, and when the rakes have reached the end of their downward strokes they are lowered by gravitation to their normal position before they are again moved upwardly to impel the sand toward the discharge opening at the upper end of the trough.

When the operation of the machine is discontinued for any length of time, the pulp remaining in the trough, and more particularly that contained in the lower portion of the same, settles and packs and would if the rakes remained in their normal position, rigidly embed their blades in a mass of sufficient solidity to prevent their movement without breakage when the operation of the machine is subsequently resumed.

When the operation of the machine is discontinued for any length of time, the rakes are moved to a position at an angle to the plane of their reciprocating movement, before the pulp has had an opportunity to settle, by rotating the winding drum by means of a handle applied to the squared end of its shaft. The rotary movement of the drum causes the chain to wind upon the peripheral surface of the same with the result that the bell crank on the shaft 28 is moved about its axis and the rake is compelled to move upwardly about its point of suspension from the arm 23, as a pivot. When the operation of the machine is subsequently resumed, the reciprocating rakes are gradually lowered until they have reached their formed position.

Inasmuch as the rakes are raised to an angle to the bottom of the trough, they are in a position to commence the discharge of sand at their first effective strokes when the operation of the machine is resumed, and by changing the angle of the plane in which the rakes have their effective movement, relative to the bottom surface of the trough, the degree of coarseness at which the sands and slimes are delivered may be varied at will without changing the degree of inclination of the trough as was required in the operation of the machine shown and described in the patents hereinabove referred to.

The universal connections between the hangers of the rakes and the parts from which they are suspended, coöperate for the self-adjustment of the rakes either laterally or up and downwardly to prevent breakage by the engagement of their blades with rocks and other obstructive objects in the trough, and to relieve the operating mechanism from strain and consequent wear.

While by reason of its greater capacity the duplex form of the classifier as shown in the drawings, is preferable, it will be understood that the improvements hereinabove described, may be applied with equal effect on machines in which a single rake element operates in an undivided trough.

Having thus described my invention what I claim and desire to secure by Letters-Patent is:

1. In an apparatus of the character described, a settling trough having a draining area, and a reciprocating rake comprising longitudinal bars and transverse scraper blades secured thereto, one of said bars having an offset portion over said area whereby the blades adjacent said portion are disposed obliquely with relation to the others.

2. In apparatus of the character described, a draining support, and a reciprocating rake extending thereover, and including a transverse blade the lower edge of which slants toward a side of said support.

3. In apparatus of the character described, a draining support, and a reciprocating rake extending thereover and including a series of transverse blades part of which have their lower edges slant toward a side of said support.

4. In apparatus of the character described, a draining support, and a reciprocating rake extending thereover and including a transverse blade the lower edge of which extends obliquely with relation to a horizontal line intersecting the line of motion.

5. In apparatus of the character described, a draining support, and a reciprocating rake extending thereover and including a series of transverse blades part of which have their lower edges extending obliquely with relation to a horizontal line intersecting the line of motion.

6. In apparatus of the character described, a draining support, and a reciprocating rake extending thereover and including a series of transverse blades part of which have their lower edges extending parallel to a horizontal line intersecting the line of motion and part of which have their lower edges extending obliquely with relation to the said line.

In testimony whereof I have affixed my signature in presence of two witnesses.

DAVID J. NEVILL.

Witnesses:
JAMES H. BURK,
G. J. ROLLANDET.